US012667125B2

(12) United States Patent
Sabuncuoglu et al.

(10) Patent No.: US 12,667,125 B2
(45) Date of Patent: Jun. 30, 2026

(54) PROCESS FOR HEAT-TREATING ONIONS

(71) Applicant: SOCIETE DES PRODUITS NESTLE S.A., Vevey (CH)

(72) Inventors: Safiye Nur Sabuncuoglu, Constance (DE); Benedikt Stiglbauer, Munich (DE); Maria Monteiro De Araujo Silva, Singen (DE); Petra Falck, Reichenau (DE); Alexander Walentin, Gaienhofen (DE)

(73) Assignee: Societe des Produits Nestle S.A., Vevey (CH)

(*) Notice: Subject to any disclaimer, the term of this patent is extended or adjusted under 35 U.S.C. 154(b) by 272 days.

(21) Appl. No.: 18/552,991

(22) PCT Filed: Mar. 29, 2022

(86) PCT No.: PCT/EP2022/058228
§ 371 (c)(1),
(2) Date: Sep. 28, 2023

(87) PCT Pub. No.: WO2022/207620
PCT Pub. Date: Oct. 6, 2022

(65) Prior Publication Data
US 2024/0188610 A1 Jun. 13, 2024

(30) Foreign Application Priority Data

Mar. 30, 2021 (EP) .................................... 21166050

(51) Int. Cl.
*A23L 19/00* (2016.01)
*A23L 5/10* (2016.01)
(52) U.S. Cl.
CPC ................ *A23L 19/03* (2016.08); *A23L 5/17* (2016.08)
(58) Field of Classification Search
CPC .................................... A23L 5/17; A23L 19/03

USPC ................................ 426/615, 442, 438, 443
See application file for complete search history.

(56) References Cited

U.S. PATENT DOCUMENTS

2013/0295253 A1* 11/2013 Knowlton ................ A23D 9/00
426/438

FOREIGN PATENT DOCUMENTS

| ES | 2681518 B2 * | 4/2019 | ............. A23L 5/13 |
| JP | 61271947 | * 12/1986 | |
| JP | 2004267128 | 9/2004 | |

OTHER PUBLICATIONS

Translation for JP 61271947 (Year: 1986).*
Translation for ES 2681518 (Year: 2019).*
Sunflower oil fatty acid profile, National Sunflower Association (Year: 2018).*
Diamante et al. "Vacuum frying foods: products, process and optimization" International Food Research Journal, 2015, vol. 22, No. 1, pp. 15-22.
Villiere et al. "Evaluation of aroma profile differences between sue, sauteed, and pan-fried onions using an innovative olfactometric approach" Flavour, 2015, vol. 4, No. 24, 19 pages.
Anonymous "Sous Vide Caramelised Onions" Oct. 17, 2014, retrieved from the Internet at https://orgasmicchef.com/soup/sous-vide-caramelised-onions/, 26 pages, XP055840140.

* cited by examiner

*Primary Examiner* — Jennifer McNeil
(74) *Attorney, Agent, or Firm* — K&L Gates LLP

(57) ABSTRACT

The present invention relates to a process for the production of heat-treated onions composition. In particularly the invention relates to a process for the production of heat-treated onions composition under vacuum between 100 to 750 mbar and wherein the moisture content of the heat-treated onions composition is below 80 wt % (based on total composition).

11 Claims, No Drawings

1

PROCESS FOR HEAT-TREATING ONIONS

CROSS REFERENCE TO RELATED APPLICATIONS

The present application is a National Stage of International Application No. PCT/EP2022/058228, filed on Mar. 29, 2022, which claims priority to European Patent Application No. 21166050.1, filed on Mar. 30, 2021, the entire contents of which are being incorporated herein by reference.

The present invention relates to a process for the production of heat-treated onions composition. In particularly the invention relates to a process for the production of heat-treated onions composition under vacuum between 100 to 750 mbar and wherein the moisture content of the heat-treated onions composition is below 80 wt % (based on total composition).

It is well known to heat treat or cook onions. There are two types of industrial cooking technologies. Most of time the cooking is done under standard atmospheric pressure. It is also known to cook the onion under pressure above the standard atmospheric pressure. By cooking onions different aroma compounds are produced, which cause an increase on the aroma of the resulting product. The taste of the cooked onions depends on the processing conditions considering the temperature, pressure and time. Often the products are sweet tasting products with only little onion flavour.

Therefore, there remains a need in the food industry for an improved process for the production of heat-treated onions composition having a delicious onion flavour avoiding off-taste, preferably a fried onion taste.

SUMMARY OF THE INVENTION

The object of the present invention is to improve the state of the art and to provide an improved or at least an alternative solution to overcome at least some of the inconveniences described above. The object of the present invention is achieved by the subject matter of the independent claims. The dependent claims further develop the idea of the present invention.

Particularly, the object of the present invention is to provide a process for the production of heat-treated onions composition having an aroma of fried onion, caramelized onion or roasted onions.

Accordingly, the present invention provides in a first aspect a process for the production of heat-treated onions composition comprising the steps of:

a) Peeling and dicing onions;

b) Mixing the peeled and diced onion with oil;

c) heating the mix from step b) between a temperature range of 55-99° C. for 15 to 240 min reducing moisture content of the mix;

d) Cooling;

wherein the heating of the mix is done under vacuum between 100 to 750 mbar and wherein the moisture content of the heat-treated onions composition after step d) is below 80 wt % (based on total composition).

It has been surprisingly found by the inventors that by the production of heat-treated onions composition using a vacuum between 100 to 750 mbar and wherein the moisture content of the heat-treated onions composition is below 80 wt % (based on total composition) a better fried onion aroma, caramelized onion aroma or roasted onion aroma of the obtained product can be achieved. By applying a vacuum between 100 to 750 mbar for the production of heat-treated onions composition and wherein the moisture content of the heat-treated onions composition is below 80 wt % (based on total composition) certain aroma compounds are increased resulting in a better fried onion note, caramelized onion note or roasted onion note. In particularly cis/trans-methyl-1-propenyl disulphide, cis/trans-methyl-1-propenyl trisulphide and/or (cis,cis)/(cis,trans)/(trans,trans)-di-1-propenyl trisulphide are increased resulting in an improved sensory profile.

DETAILED DESCRIPTION OF THE INVENTION

In a preferred aspect the present invention pertains to a process for the production of heat-treated onions composition comprising the steps of:

a) peeling and dicing onions;

b) mixing the peeled and diced onion with oil;

c) heating the mix from step b) between a temperature range of 55-99° C. for 15 to 240 min reducing moisture content of the mix;

d) cooling;

wherein the heating of the mix is done under vacuum between 100 to 750 mbar and wherein the moisture content of the heat-treated onions composition after step d) is below 80 wt % (based on total composition).

In a preferred aspect the present invention pertains to a process for the production of heat-treated onions composition comprising the steps of:

a) peeling and dicing onions;

b) mixing 80 to 95 wt % (by weight of the total composition) of the peeled and diced onion with 5 to 20 wt % (by weight of the total composition) of oil;

c) heating the mix from step b) between a temperature range of 55-99° C. for 15 to 240 min reducing moisture content of the mix;

d) cooling;

wherein the heating of the mix is done under vacuum between 100 to 750 mbar and wherein the moisture content of the heat-treated onions composition after step d) is below 80 wt % (based on total composition).

In a preferred aspect the present invention pertains to a process for the production of heat-treated onions composition comprising the steps of:

a) peeling and dicing onions;

b) mixing 85 to 93 wt % (by weight of the total composition) of the peeled and diced onion with 7 to 15 wt % (by weight of the total composition) of oil;

c) heating the mix from step b) between a temperature range of 55-99° C. for 15 to 240 min reducing moisture content of the mix;

d) cooling;

wherein the heating of the mix is done under vacuum between 100 to 750 mbar and wherein the moisture content of the heat-treated onions composition after step d) is below 80 wt % (based on total composition).

In a preferred aspect the present invention pertains to a process for the production of heat-treated onions composition comprising the steps of:

a) peeling and dicing onions;

b) mixing 85 to 93 wt % (by weight of the total composition) of the peeled and diced onion with 7 to 15 wt % (by weight of the total composition) of oil;

c) heating the mix from step b) between a temperature range of 60-95° C. for 15 to 240 min reducing moisture content of the mix;

d) cooling;

wherein the heating of the mix is done under vacuum between 100 to 750 mbar and wherein the moisture content of the heat-treated onions composition after step d) is below 80 wt % (based on total composition).

In a preferred aspect the present invention pertains to a process for the production of heat-treated onions composition comprising the steps of:

a) peeling and dicing onions;

b) mixing 85 to 93 wt % (by weight of the total composition) of the peeled and diced onion with 7 to 15 wt % (by weight of the total composition) of oil;

c) heating the mix from step b) between a temperature range of 55-99° C. for 15 to 240 min reducing moisture content of the mix;

d) cooling;

wherein the heating of the mix is done under vacuum between 100 to 750 mbar and wherein the moisture content of the heat-treated onions composition after step d) is below 80 wt % (based on total composition) and wherein the oil comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

In a second aspect the invention relates to a heat-treated onion composition comprising a combination of 5 to 100 mg/kg of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition), preferably between 7 to 80 mg/kg of the combination consisting of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition).

In a preferred aspect the invention relates to a heat-treated onion composition comprising at least 3.0 mg/kg cis/trans-methyl-1-propenyl disulphide (by total weight of the composition) and at least 1.3 mg/kg cis/trans-methyl-1-propenyl trisulphide (by total weight of the composition) and at least 0.2 mg/kg (cis,cis)/(cis,trans)/(trans,trans)-di-1-propenyl trisulphide (by total weight of the composition).

In a preferred aspect the invention relates to a heat-treated onion composition comprising between 10.0 to 65 mg/kg cis/trans-methyl-1-propenyl disulphide (by total weight of the composition) and between 2.5 to 20 mg/kg cis/trans-methyl-1-propenyl trisulphide (by total weight of the composition) and between 0.4 to 2.5 mg/kg (cis,cis)/(cis,trans)/(trans,trans)-di-1-propenyl trisulphide (by total weight of the composition).

In a preferred aspect of the invention, there is provided a product obtainable by the process of the invention. All combinations should be considered.

The term "onion" as used herein, unless indicated otherwise, refers to onion bulb. It refers to a non-dehydrated onion. In an embodiment the heat-treated onions composition comprises between 75 to 99 wt % of peeled and sliced onions (by weight of the total composition), preferable between 80 to 99 wt %, preferable between 80 to 96 wt %, preferable between 85 to 99 wt %, preferable between 85 to 96 wt %, preferable between 85 to 93 wt % (by weight of the total composition).

The term "oil" of the present invention has a solid fat content (SFC) at 20° C. below 12 wt %, preferably has a solid fat content (SFC) at 20° C. between 0 to 12 wt %, preferably has a solid fat content (SFC) at 20° C. between 0 to 10 wt %, preferably has a solid fat content (SFC) at 20° C. between 0 to 8 wt %, preferably has a solid fat content (SFC) at 20° C. between 0 to 6 wt %. The oil or fat of the present invention has a solid fat content (SFC) at 20° C. below 6 wt %. Oil is liquid at a temperature of 25° C., preferably at a room temperature of 20° C. Sunflower oil has a solid fat content (SFC) at 20° ° C. of 0. Olive oil has a solid fat content (SFC) at 20° C. of 0. In a preferred embodiment the oil is selected from the group consisting of sunflower oil, rapeseed oil, cotton seed oil, peanut oil, soy oil, olive oil, algal oil, safflower oil, corn oil, rice bran oil, sesame oil, hazelnut oil, avocado oil, almond oil, walnut oil or a combination thereof; more preferably sunflower oil or rapeseed oil or a combination thereof; most preferably sunflower oil. The term sunflower oil comprises standard sunflower oil or high-oleic sunflower oil or a combination thereof. In a further embodiment, the heat-treated onion comprises oil in an amount between 5 to 20% (by weight of the total composition), preferably between 6 to 18%, preferably between 7 to 17%, preferably between 7 to 15%, preferably 8 to 15%, preferably 8 to 13% (by weight of the total composition).

In a further embodiment the term "oil" according to this invention comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat) is a high oleic sunflower oil. In an embodiment the oil comprises C16:0. C16:0 is palmitic acid. In a further embodiment C16:0 is in the range of 1 to 25 wt % (based on weight of total fat), preferably C16:0 is in the range of 1 to 20 wt % (based on weight of total fat), preferably C16:0 is in the range of 1 to 15 wt % (based on weight of total fat), preferably C16:0 is in the range of 1 to 10 wt % (based on weight of total fat), more preferably C16:0 is in the range of 2 to 7 wt % (based on weight of total fat). In an embodiment the oil comprises C18:1. C18:1 is oleic acid. In a further embodiment C18:1 is in the range of 60 to 90 wt % (based on weight of total fat), preferably C18:1 is in the range of 65 to 90 wt % (based on weight of total fat), preferably C18:1 is in the range of 70 to 90 wt % (based on weight of total fat), preferably C18:1 is in the range of 75 to 90 wt % (based on weight of total fat), more preferably C18:1 is in the range of 80 to 90 wt % (based on weight of total fat). In an embodiment the oil comprises C18:2. C18:2 is linoleic acid. In a further embodiment C18:2 is in the range of 0.1 to 20 wt % (based on weight of total fat), preferably C18:1 is in the range of 0.1 to 15 wt % (based on weight of total fat), preferably C18:1 is in the range of 0.1 to 10 wt % (based on weight of total fat), preferably C18:1 is in the range of 0.5 to 10 wt % (based on weight of total fat), more preferably C18:1 is in the range of 0.5 to 5 wt % (based on weight of total fat). In an embodiment the oil of this invention has a melting point of −1 to +5° C. and relative density of 0.91. It is preferred that the oil is liquid at room temperature (20° C.) to avoid unnecessary heating during storage and transfer of oil into the process, higher storage temperature of oil would already lead to oxidation of oil.

Heat-treating is a process wherein moisture from onion is removed to a desired level and raw taste is eliminated and characteristic fried onion flavor is generated in the end product. The heat-treatment with oil is done between a temperature range of 55-99° C. for 15 to 240 min, preferably between a temperature range of 55 to 95° C. for 15 to 240 min, preferably between a temperature range of 60 to 95° C.

for 15 to 240 min, 55-99° C. for 20 to 180 min, preferably between a temperature range of 55 to 95° C. for 20 to 120 min, preferably between a temperature range of 60 to 95° C. for 25 to 100 min, preferably a temperature range of 60 to 95° C. for 25 to 100 min between 30 to 80 min. The heating of the mix is done under vacuum between 100 to 750 mbar, preferably between 180 to 710 mbar, preferably between 100 to 500 mbar, preferably between 100 to 300 mbar.

Cooling means that the temperature of the heat-treated onion is reduced. It is desirable to have the heat-treated onion at temperature between 20 to 30° C., more preferably between 20 to 25° C.

In an embodiment the moisture content of the heat-treated onions composition after step d) is below 80 wt % (based on total composition), preferably below 75 wt %, preferably below 72 wt %, preferably below 70 wt %, preferably below 60 wt %, preferably below 50 wt %, preferably between 7 to 80 wt %, preferably between 7 to 75 wt %, preferably between 7 to 72 wt %, preferably between 7 to 70 wt %, preferably between 7 to 60 wt %, preferably between 7 to 50 wt % (based on total composition).

In an embodiment the process for the production of heat-treated onions composition does not comprise starch and/or flour. In an embodiment the process for the production of heat-treated onions composition is free from starch and/or flour.

In a second aspect the present invention pertains to a heat-treated onion composition comprising a combination of 5 to 100 mg/kg of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition), preferably between 7 to 100 mg/kg of the combination consisting of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition), preferably between 10 to 100 mg/kg of the combination consisting of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition), preferably between 10 to 80 mg/kg of the combination consisting of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition).

In a preferred aspect the invention relates to a heat-treated onion composition comprising at least 3.0 mg/kg cis/trans-methyl-1-propenyl disulphide (by total weight of the composition) and at least 1.3 mg/kg cis/trans-methyl-1-propenyl trisulphide (cis,cis)/(cis,trans)/(trans,trans)-di-1-propenyl trisulphide (by total weight of the composition) and at least 0.2 mg/kg (cis,cis)/(cis,trans)/(trans,trans)-di-1-propenyl trisulphide (by total weight of the composition), preferably at least 6.5 mg/kg cis/trans-methyl-1-propenyl disulphide (by total weight of the composition) and at least 2.0 mg/kg (cis,cis)/(cis,trans)/(trans,trans)-di-1-propenyl trisulphide (by total weight of the composition) and at least 0.4 mg/kg (cis,cis)/(cis,trans)/(trans,trans)-di-1-propenyl trisulphide (by total weight of the composition), preferably at least 10.0 mg/kg cis/trans-methyl-1-propenyl disulphide (by total weight of the composition) and at least 2.5 mg/kg cis/trans-methyl-1-propenyl trisulphide (by total weight of the composition) and at least 0.5 mg/kg (cis,cis)/(cis,trans)/(trans,trans)-di-1-propenyl trisulphide (by total weight of the composition).

In a preferred aspect the invention relates to a heat-treated onion composition comprising between 3.0 to 100 mg/kg cis/trans-methyl-1-propenyl disulphide (by total weight of the composition) and between 2.5 to 20 mg/kg cis/trans-methyl-1-propenyl trisulphide (by total weight of the composition) and between 0.4 to 2.5 mg/kg (cis,cis)/(cis,trans)/(trans,trans)-di-1-propenyl trisulphide (by total weight of the composition), preferably between 6.5 to 100 mg/kg cis/trans-methyl-1-propenyl disulphide (by total weight of the composition) and between 2.5 to 25 mg/kg cis/trans-methyl-1-propenyl trisulphide (by total weight of the composition) and between 0.4 to 3.0 mg/kg (cis,cis)/(cis,trans)/(trans,trans)-di-1-propenyl trisulphide (by total weight of the composition), preferably between 10.0 to 65 mg/kg cis/trans-methyl-1-propenyl disulphide (by total weight of the composition) and between 2.5 to 20 mg/kg cis/trans-methyl-1-propenyl trisulphide (by total weight of the composition) and between 0.5 to 2.5 mg/kg (cis,cis)/(cis,trans)/(trans,trans)-di-1-propenyl trisulphide (by total weight of the composition).

Those skilled in the art will understand that they can freely combine all features of the present invention disclosed herein. In particular, features described for different embodiments of the present invention may be combined. Where known equivalents exist to specific features, such equivalents are incorporated as if specifically referred to in this specification.

EXAMPLES

Example 1: Process

Onions are peeled and diced into size of 10×10 mm. This mix of diced fresh onions are fed into Stephan mixer (V-MC 401 STEPHAN Vacutherm) with oil.

When the onion and oil mix is in the vessel, the lid is closed and the pressure is decreased with a vacuum pump. The heating is applied via double jacketed steam.

Quantification of volatile sulfide compounds was achieved via headspace solid-phase microextraction combined with gas chromatography-triple quadrupole-mass spectrometry (HS-SPME-GC-MS/MS). Approximately 1 g of homogenized onion sample was weighed in a glass vial and 5 mL of 20% aqueous sodium chloride solution was added before closing the vial. For analysis the samples were incubated for 10 min at 65° C. and then the SPME fiber (2 cm; 50/30 mm DVB/CAR on PDMS, Supelco) was exposed to the headspace above the sample for 30 min at the same temperature while shaking for both steps. Afterwards the fiber was placed into the injector at 220° C. for desorption. The used column for GC was a DB 5MS UI (30 m×0.25 mm×0.25 μm, Agilent) with the temperature program starting at 40° C. (3 min hold) and a heat ramp to 300° C. at 15° C./min (5 min hold) with a helium carrier gas flow of 1.5 mL/min. The MS/MS detection was run in Multiple-reaction monitoring (MRM) mode using electron ionization (EI) at 70 eV ionization energy with source temperature at 230° C. and quadrupole temperatures at 150° C. The transfer line from GC to the detector was kept at 250° C. Two MRM transitions were used for each analyte. One was applied for quantification (Quantifier) and the other one to confirm the identity of the specific compound (Qualifier) by comparing Quantifier/Qualifier area ratios to beforehand determined values. Quantification was done using the internal standard (IS) method with diallyl disulfide as the IS

Examples 2-5

Comparison example 2 is done according to example 1, but without closing the lid and applying a vacuum (open vessel). Comp. example 3 and examples 4-5 are prepared corresponding to example 1.

| | Comp. Ex 2 | Comp. Ex 3 | Ex 4 | Ex. 5 |
|---|---|---|---|---|
| Amount of Onion | 90% | 90% | 90% | 90% |
| Type of oil | sunflower oil | sunflower oil | sunflower oil | HOSO |
| Amount of oil | 10% | 10% | 10% | 10% |
| Pressure [mbar] | atmospheric | 800 | 700 | 700 |
| Temperature of onion-oil-mix [° C.] | 100 | 85 | 75 | 75 |
| Time [min] | 50 | 40 | 35 | 35 |
| cis/trans-methyl-1-propenyl disulphide [mg/kg] | 0.311 | 1.202 | 3.473 | 3.601 |
| cis/trans-methyl-1-propenyl trisulphide [mg/kg] | 0.019 | 1.077 | 1.599 | 1.730 |
| (cis, cis)/(cis, trans)/(trans, trans)-di-1-propenyl trisulphide [mg/kg] | 0.0004 | 0.183 | 0.307 | 0.397 |
| Moisture content | 70 | 70 | 70 | 70 |
| Sensory data | Sautéed onions cooked taste, local browning | Translucent onions boiled onion taste, slight browning | Sautéed onions Clear difference vs comp. ex. 1. More overall intense, more fried onion and sweet note, soft texture, lighter homogenous color | Sautéed onions Clear difference vs comp. ex. 1. More overall intense, more fried onion note, soft texture, lighter color |
| *Sensory data— Off note evaluation by panel after 9 months | More than 2 on scale of 5 (probably due to lipid oxidation compounds) | More than 2 on scale of 5 (probably due to lipid oxidation compounds) | Less than 2 on scale of 5 | Less than 1 on scale of 5 |

*0—No off note, 5—Very high off notes (Flavor and Aroma); 20 panellists tested.

It is shown that by using a process of the invention for heat-treating onions by applying a vacuum below 800 mbar, certain aroma compounds are increased resulting in a better fried onion note. Comp. Ex. 3 corresponds JP2004267128 disclosing an onion heat-treatment using a vacuum of 800 mbar. The heat-treating onions composition of examples 4 and 5 comprising at least 3.0 mg/kg cis/trans-methyl-1-propenyl disulphide (by total weight of the composition) and at least 1.3 mg/kg cis/trans-methyl-1-propenyl trisulphide (by total weight of the composition) and at least 0.2 mg/kg (cis,cis)/(cis,trans)/(trans,trans)-di-1-propenyl trisulphide (by total weight of the composition), which result in the better fried onion taste compared to comparison examples 2 and 3. Using HOSO (high-oleic sunflower oil) result in a better shelf-life taste of the product.

Examples 6 to 8

The following examples are prepared corresponding to example 1.

| | Ex 6 | Ex 7 | Ex 8 |
|---|---|---|---|
| Amount of Onion | 90% | 90% | 85% |
| Type of oil | sunflower oil | sunflower oil | sunflower oil |

-continued

| | Ex 6 | Ex 7 | Ex 8 |
|---|---|---|---|
| Amount of oil | 10% | 10% | 15% |
| Pressure [mbar] | 200 | 200 | 200 |
| Temperature of onion-oil-mix [° C.] | 80 | 85 | 85 |
| Time [min] | 75 | 83 | 83 |
| cis/trans-methyl-1-propenyl disulphide [mg/kg] | 13.220 | 51.699 | 48.876 |
| cis/trans-methyl-1-propenyl trisulphide [mg/kg] | 3.372 | 13.569 | 14.467 |
| (cis,cis)/(cis, trans)/(trans,trans)-di-1-propenyl trisulphide [mg/kg] | 0.756 | 1.769 | 1.931 |
| Moisture content | 45 | 15 | 12 |
| Sensory data | caramelized onions sweet, caramelized onion, fried onion, soft texture, caramel color | roasted onions smokey, roasted onion, harder texture, darker color | roasted onions smokey, little more roasted onion taste compared to ex 6, harder texture, darker color, oily |

It is shown that for caramelized or roasted onions the flavor compounds are further increased for heat-treated onions composition under vacuum.

Example 9

An onion soup has been prepared using 500 g of caramelized onions according to example 6 and 11 bouillon broth (soup A). In addition, a second onion soup has been prepared by using 500 g of onions according to example 1 and 11 bouillon broth (soup B). Both onion soups have been cooked for 5 min.

6 internal experienced panelists were used to rate the taste of soup A and soup B. All 6 panelists rated soup A as being much more intense compared to soup B.

Example 10

A Bolognese sauce has been prepared by frying 1 kg minced meat (beef) adding salt and black pepper and 1.5l tomato sauce. The obtained non-final sauce has been divided in two equal portions. To one portion 300 gr of a 50/50 mix of onions according to example 6 and example 7 are added and further cooked for 10 min (Bolognese A). To the other portion 300 gr of onions according to example 1 are added and also cooked for 10 min (Bolognese B). 6 internal experienced panelists were used to rate the taste of Bolognese A and Bolognese B. All 6 panelists rated Bolognese A as having a more round and sweeter taste, which was more appreciated compared to Bolognese B.

Comp. Example 11: Sous Vide Cooking

Onions are peeled and diced into size of 10×10 mm. This mix of diced fresh onions are fed into a plastic bag with oil and vacuum sealed.

| | Comp. Ex 11 Sous vide |
|---|---|
| Amount of Onion | 90% |
| Type of oil | sunflower oil |

9

-continued

| | Comp. Ex 11 Sous vide |
|---|---|
| Amount of oil | 10% |
| Temperature of onion-oil-mix [° C.] | 100 |
| Time [min] | 1440 |
| cis/trans-methyl-1-propenyl disulphide [mg/kg] | 2.004 |
| cis/trans-methyl-1-propenyl trisulphide [mg/kg] | 1.103 |
| (cis, cis)/(cis, trans)/(trans, trans)-di-1-propenyl trisulphide [mg/kg] | 0.101 |
| Moisture content [wt %] | 84 |
| Sensory data | Brown onions with slight caramel note and boiled onion aroma, animalic |

It is shown that by using sous vide technology to cook onions, certain aroma compounds are not as much increased and not resulting in a better fried onion note compared using a process of the invention. In addition, the final moisture content of the sous vide product is 84 wt % as the water can't be evaporated due to the sealed plastic bag.

The invention claimed is:

1. A process for production of a heat-treated onions composition, the method comprising:
   a) peeling and dicing onion;
   b) mixing the peeled and diced onion with oil to obtain a mix;
   c) heating the mix from step b) in a temperature range of 55-99° C. for 15 to 240 min reducing moisture content of the mix; and
   d) cooling,
   wherein the heating of the mix is done under vacuum of 180 to 710 mbar, and a moisture content of the heat-treated onions composition after step d) is below 80 wt % (based on total composition), and
   the heat-treated onions composition has a formulation selected from the group consisting of
   (i) at least 3.0 mg/kg cis/trans-methyl-1-propenyl disulphide (by total weight of the composition), at least 1.3 mg/kg cis/trans-methyl-1-propenyl trisulphide (by total weight of the composition), and at least 0.2 mg/kg (cis,cis)/(cis,trans)/(trans,trans)-di-1-propenyl trisulphide (by total weight of the composition),
   (ii) at least 10.0 mg/kg cis/trans-methyl-1-propenyl disulphide (by total weight of the composition), at least 2.5 mg/kg cis/trans-methyl-1-propenyl trisulphide (by total weight of the composition), and at least 0.4 mg/kg (cis,cis)/(cis,trans)/(trans,trans)-di-1-propenyl trisulphide (by total weight of the composition), and
   (iii) 10.0 to 65 mg/kg cis/trans-methyl-1-propenyl disulphide (by total weight of the composition), 2.5 to 20 mg/kg cis/trans-methyl-1-propenyl trisulphide (by total weight of the composition), and 0.4 to 2.5 mg/kg (cis,cis)/(cis,trans)/(trans,trans)-di-1-propenyl trisulphide (by total weight of the composition).

2. The process of claim 1, wherein in step b) 80 to 95 wt % (by weight of the total composition) of the peeled and diced onion are mixed with 5 to 20 wt % (by weight of the total composition) of oil.

3. The process of claim 1, wherein the heating is done via double jacketed steam.

4. The process of claim 1, wherein the heating is done at a temperature range of 55 to 95° C. for 20 to 120 minutes.

5. The process of claim 1, wherein the oil is sunflower oil.

6. The process of claim 1, wherein the oil comprises sunflower oil comprising fatty acids C16:0 in a range of 1 to 25 wt % (based on weight of total fat), C18:1 in a range of 60 to 90 wt % (based on weight of total fat), and C18:2 in a range of 0.1 to 20 wt % (based on weight of total fat).

7. The process of claim 1, wherein the heat-treated onions composition does not comprise starch and/or flour.

8. The process of claim 1, wherein the moisture content of the heat-treated onions composition after step d) is 7 to 75 wt % (based on total composition).

9. The process of claim 1, wherein the heat-treated onions composition comprises 5 to 100 mg/kg of a combination of cis/trans-methyl-1-propenyl disulphide and cis/trans-methyl-1-propenyl trisulphide and (cis,cis)/(cis,trans)/(trans,trans)-di-1-propenyl trisulphide (by total weight of the composition).

10. The process of claim 1, wherein the heating of the mix is done under vacuum of 180 to 500 mbar.

11. The process of claim 1, wherein the heating of the mix is done under vacuum of 180 to 300 mbar.

* * * * *